United States Patent
Chickanosky

(10) Patent No.: US 6,937,414 B2
(45) Date of Patent: Aug. 30, 2005

(54) METHOD AND APPARATUS FOR FINE POSITION ADJUSTMENT USING PHASE IN A SERVO TRACK WRITER FOR DISK DRIVES

(75) Inventor: Valerie H. Chickanosky, South Burlington, VT (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 280 days.

(21) Appl. No.: 10/292,236

(22) Filed: Nov. 12, 2002

(65) Prior Publication Data

US 2004/0090694 A1 May 13, 2004

(51) Int. Cl.[7] .................................................. G11B 5/09
(52) U.S. Cl. ............................. 360/51; 360/75; 360/53
(58) Field of Search ............................. 360/51, 75, 53, 360/31

(56) References Cited

U.S. PATENT DOCUMENTS

| 4,996,608 A | 2/1991 | Widney |
| 5,903,404 A | 5/1999 | Tsurumi et al. |
| 6,172,830 B1 | 1/2001 | Leonard |
| 6,674,593 B2 * | 1/2004 | Jolly et al. .................... 360/51 |

OTHER PUBLICATIONS

"Regenerative Clock Technique for Servo Track Writers", IBM Technical Disclosure Bulletin, Oct. 1990, pp. 310–311.

* cited by examiner

*Primary Examiner*—Alan T. Faber
(74) *Attorney, Agent, or Firm*—Scully, Scott, Murphy & Presser

(57) ABSTRACT

A system and method for enabling a programmed phase change in a servo track writer (STW) clock providing signals for writing information to a servo track, the phase change programmed to occur in one or more large or small phase bumps in either positive and negative directions, whereby a large phase jump is defined as the largest block of bit unit that can be handled without introducing noise into the system, and a smaller phase bump that is the smallest incremental bit unit that may be programmed to change the servo write clock phase until a final phase offset is reached.

20 Claims, 3 Drawing Sheets

METHOD AND APPARATUS FOR FINE POSITION ADJUSTMENT USING PHASE IN A SERVO TRACK WRITER FOR DISK DRIVES

BACKGROUND OF THE INVENTION

1. Field of the Invention

The present invention relates generally to servo track writing technology, and more particularly, to a novel system and method for adjusting phase in a servo track writer.

2. Description of the Prior Art

Servo track writing is the process of writing servo-data track segments on tracks of the disk media before any user data may be written to the disk. These servo-data track segments allow the hard disk drive to determine where the read/write head of the disk drive is relative to the disk surface.

In conventional hard disk drive systems, a read channel is provided which functions as the interface between the hard disk and computer or hard disk controller to read information off the hard disk or write information to the hard disk, typically in encoded form. The writing of servo track information, i.e., servo-data segments, in the prior art, requires special servo-data write systems which are expensive and require a clean room environment. However, conventional systems implement a modified read channel to enable writing of servo-data and servo information onto a disk drive in order to avoid this expense, i.e., the servo information may be written by the disk drive outside of the clean room environment.

In such a modified system, the servo information is written by the read channel itself. However, the servo information needs to be very precisely located in order to enable the head of the disk drive to be positioned to read/write data from/to the disk.

Typically the servo data is written on to servo data segments of a disk track once, at very precise track locations. Furthermore, in such a system, the servo write process is typically iterative, and entails writing on the inside circumference of the disk drive, reading the data and measuring the time between a successive sync words. If there's been an error in writing that data it will make a correction on the next track location so that the error will not be propagated as servo track information is being successively written. The measurement technique involves measuring the distance between successive sync words, particularly by reading a sync word and, at that time, begin counting oscillator periods without adjusting phase. Then, in order to find the next sync word, the phase of the oscillator has to be moved a certain amount. Thus, it must be calculated how much to move the oscillator phase so that the measurement is the integer number of oscillator periods plus the actual amount of phase it would have to move with the measurement (the phase is a fractional amount of the oscillator period).

FIG. 1 is a diagram illustrating the timing of reading and writing of servo-data to segment tracks of a magnetic or hard disk. As shown in FIG. 1, the distance between a first already written servo sync word 305 and a yet unwritten servo-data 310 (e.g. a sync word expressed as bit time) is "M.x" bits, where M is a selectable whole integer of read channel clock cycles, and "x" is obtained by shifting the phase of a servo track writer oscillator signal generating the read channel clock by the phase offset between the system clock signal and the signal obtained from reading a sync field portion of a servo sync word 305 until the read channel clock and the sync field signal match. It will then suspend normal phase corrections, and go into write mode M.x bit times later and begin writing a servo pattern. The integer portion of the delay will be calculated by a sequencer that counts at half bit rate. It is understood that the value of "M" will vary from track to track as track segments become longer the further the track including the track segments is from the center of the disk. The fractional portion of the delay "x" is obtained by bumping the phase of the oscillator by the appropriate amount in phase steps of, 1/96 of a bit time, for example. After calculating "x," the servo sync word 310 may be written. Further, the distance between a first already written servo sync word 305 and a second already written sync word (i.e., servo sync word 315) expressed as bit time is "N.z" bits, where "N" is a measured whole integer of system clocks and "z" is the phase offset between the frequency of signals obtained from the reading of the sync fields of each servo sync word 305, 315. This measurement is incorporated into the writing of the next servo sync word to correct for errors in the placement of the servo sync words that may occur.

The phase curve portion 320 of FIG. 1 illustrates how the phase of servo sync word 305 may differ from the phase of servo sync word 315.

The fundamental technology limiting the servo format efficiency of current servo track writer systems is the phase alignment system at the servo writer. Currently, the fundamental measurement techniques used at the servo track writer are the gates to further improvement in phase alignment tolerance. Secondly, servo format efficiency is critical as more of the real estate of the track is taken up with servo information, therefore, limiting the amount of available space for data. As a result, innovative servo track writer measurement techniques that make use of novel applications of modern signal processing methods are of key importance.

There currently exists a Servo Track writer system which uses the existing read channel information to provide for all the major measurement and write functions needed to write the servo data. Servo Track Writer applications require precise, fast, programmable phase adjustment for the oscillator without adding noise to the system. In accordance with a system known to the inventors as "Falcon", the programmed phase adjustment is a signed value with a 1/96 of a bit time resolution, and the phase is moved by that amount to achieve the desired offset. The implementation of the "Falcon" technology, namely, was incrementally change the phase by 1/96 bit time steps one every half rate clock cycle. This approach however would take the maximum time; hence, limiting the start of possible write locations. This would take up to 96*2=192 bit times in "nonskootch" mode, and up to (96+4)*2=288 bit times in skootch mode where the system clock phase is restored to its phase value prior to synchronizing to a sync word so that data may be thereafter written at a pre-determined location relative to the sync word. This would be a limiting factor, an therefore not a desirable solution.

A second potential approach would be to directly adjust the phase by setting the phase on a mixer's controller. This would provide for a fast transaction; however, the large abrupt phase shift would introduce noise into the system. The effects of the noise on the digital clocks and logic is unknown and therefore an unacceptable risk.

It would be highly desirable to provide a system and method for enabling a programmed phase change whereby first the largest pre-calculated blocks that can be handled without introducing noise is defined, then the phase would be incrementally changed with smaller units until the final destination is reached.

SUMMARY OF THE INVENTION

It is an object of the present invention to provide a system and method for enabling a programmed phase change in a servo track writer (STW) clock providing signals for writing information to a servo track, the phase change programmed to occur in one or more large or small phase bumps in either positive and negative directions, whereby a large phase jump is defined as the largest block of bit unit that can be handled without introducing noise into the system, and a smaller phase bump that is the smallest incremental bit unit that may be programmed to change the servo write clock phase until a final phase offset is reached.

The bit unit implemented in the system is defined as a fraction of a servo track writer clock cycle. The large phase bump size for adjusting servo track writer clock phase is $\frac{4}{96}$ bit, and for a small phase bump is $\frac{1}{96}$ bit. The block is pre-calculated and may depend upon the clock speed (STW Oscillator).

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENT

Operational details regarding the system architecture and functioning of the servo track writer system is described in commonly-owned, co-pending U.S. patent application Ser. No. 10/293,370 entitled "READ CHANNEL WITH AUTOMATIC SERVO TRACK WRITE," the whole contents and disclosure of which is incorporated by reference as if fully set forth herein.

Figure 2:
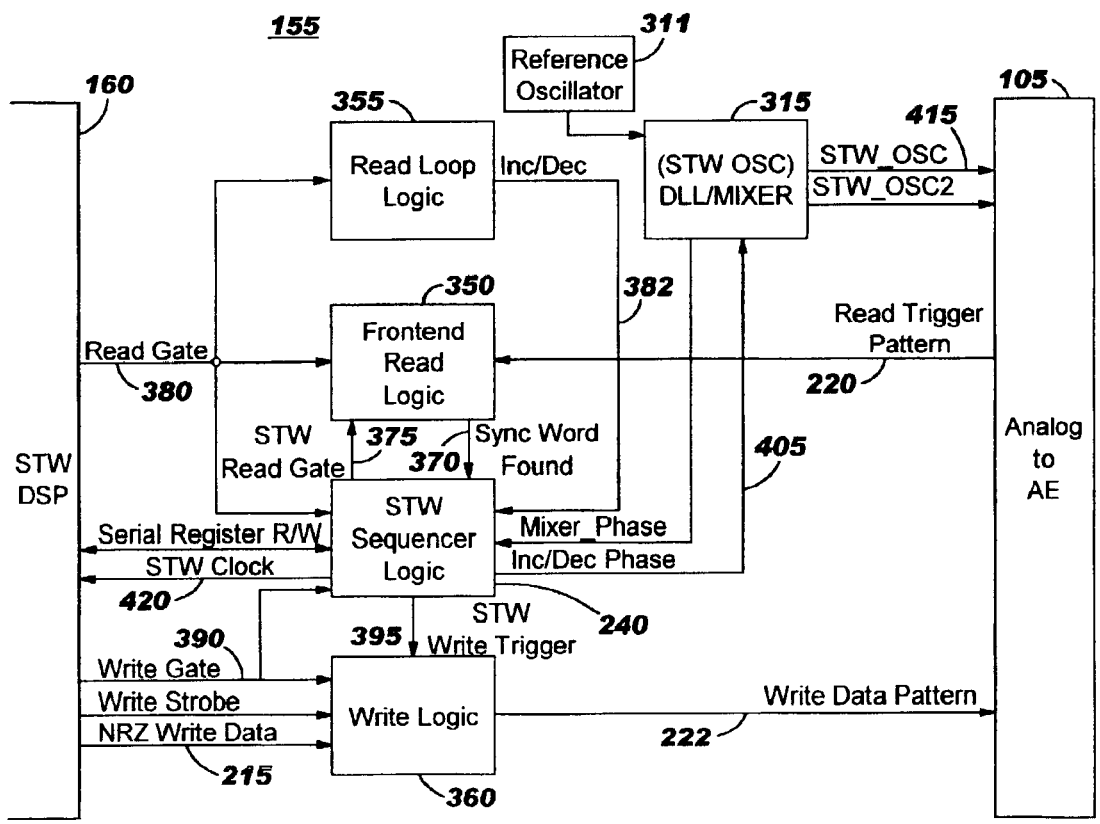
FIG. 2 illustrates a system block diagram of the modified read channel 155 according to the invention.

Briefly, FIG. 2 illustrates a system block diagram of the modified read channel 155 according to the invention, which includes the servo track writer (STW) interfaced between a hard disk control element 160 (e.g., a digital signal processor element) for controlling the writing of servo-data to a hard disk assembly 105, e.g., a magnetic disk, and particularly to precise locations within servo-data segments after a servo-track sync word is found. As shown in FIG. 2, the STW read channel 155 components include: an STW sequencer logic circuit 240, a DLL/Mixer or STW Oscillator circuit 315, front end read and read loop logic circuits 350, 355 and a write logic circuit 360.

The front-end read logic circuit 355 of the modified read channel 155 of FIG. 2 particularly functions to pass a servo Sync Word Found (SWF) signal 370 to STW sequencer 240 and can receive a STW READ GATE signal 380 from the controller 160. The READ GATE signal 380 enables read logic 350 to receive user-data READ signal 220 from the user data track segments of the magnetic (hard) disk of the disk assembly 105. The STW READ GATE signal 380 particularly enables the read logic to receive servo data via READ signal 220.

Figure 1:
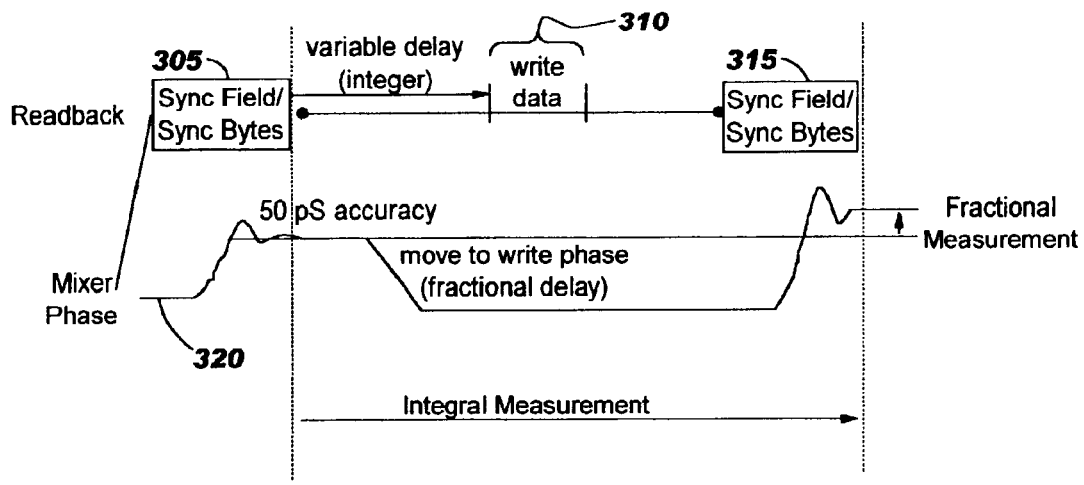
FIG. 1 is a diagram illustrating the timing of reading and writing of servo-data to segment tracks of a magnetic or hard disk.

Loop logic circuit 355 operates similarly to the loop logic found in conventional read channels. However, loop logic 355 additionally passes phase corrections in the form of LOOP_INC and LOOP_DEC signals 382 to the STW Sequencer logic circuit 240. The Loop logic circuit 355 additionally receives the READ GATE signal 380 from the hard disk controller 160 and determines the amount of phase offset necessary to perform a read operation. That is, the front end read and read loop logic particularly keeps track of how much phase to move dependent on the lengths of the sync word (FIG. 1) each time it is read. In the performance of a read operation, the system clock has to be in phase with the STWR frequency in order to read the sync word on the disk (i.e., it determines when it is in phase). While it is moving the phase of the clock, the system tracks the logic signals generated for incrementing or decrementing the phase by the appropriate amounts. Thus, once the read logic has determined it found the sync word, the STW sequencer is implemented to move the phase back to where it was so it can begin servo track writing at a precise location relative to the sync word. As will be described in greater detail, the phase accumulator block of the STW sequencer 240 has stored how much the phase had moved and in what direction. It kicks off the sequencer 240 to implement increments or decrements in phase bump units (granularity of $\frac{1}{96}$ clock cycle) until the phase of the servo clock is back to where it was before the sync read (in skootch mode). This is then followed by a user programmed phase offset in large and/or smaller phase bump units.

The write logic circuit 360 functions to receive a WRITE TRIGGER signal 395 from the STW Sequencer 240 in addition to the normal WRITE GATE signal 390 from the hard disk controller 160. The STW READ GATE 380 enables read of servo-data track segments during servo-data track segment write operations and STW WRITE GATE signal 390 enables write of servo-data track segments. Both user data and servo-data is received from hard disk controller 160 via the NRZ DATA signal 215 and the user data and servo-data is serially stored in response to WRITE STROBE signal 405. The Write logic block 360 functions to write to the hard disk assembly via WRITE Signal 222.

The frequency of STW oscillator 315 is locked to the frequency of a reference oscillator 311, however the STW oscillator is phase adjustable. STW oscillator 315 employs a delayed lock loop (DLL) circuit and a Mixer circuit to make the phase adjustment in response to receipt of a STW_INC-signal and/or STW_DEC signal 405 from STW sequencer 240 during servo sync word write and, in response to other signals (not shown) during servo sync word read. STW oscillator 315 additionally passes a STW_OSC signal 415 to STW sequencer 240. STW_OSC signal 415 is a reference oscillator signal adjusted to match the phase of the sync field of the current servo sync word. In one example, the resolution of the phase adjustment is $\frac{1}{96}$ of a bit time. Finally STW sequencer 240 passes an STW_CLK signal 420 to hard disk controller 160 as described in greater detail hereinbelow.

Figure 3:
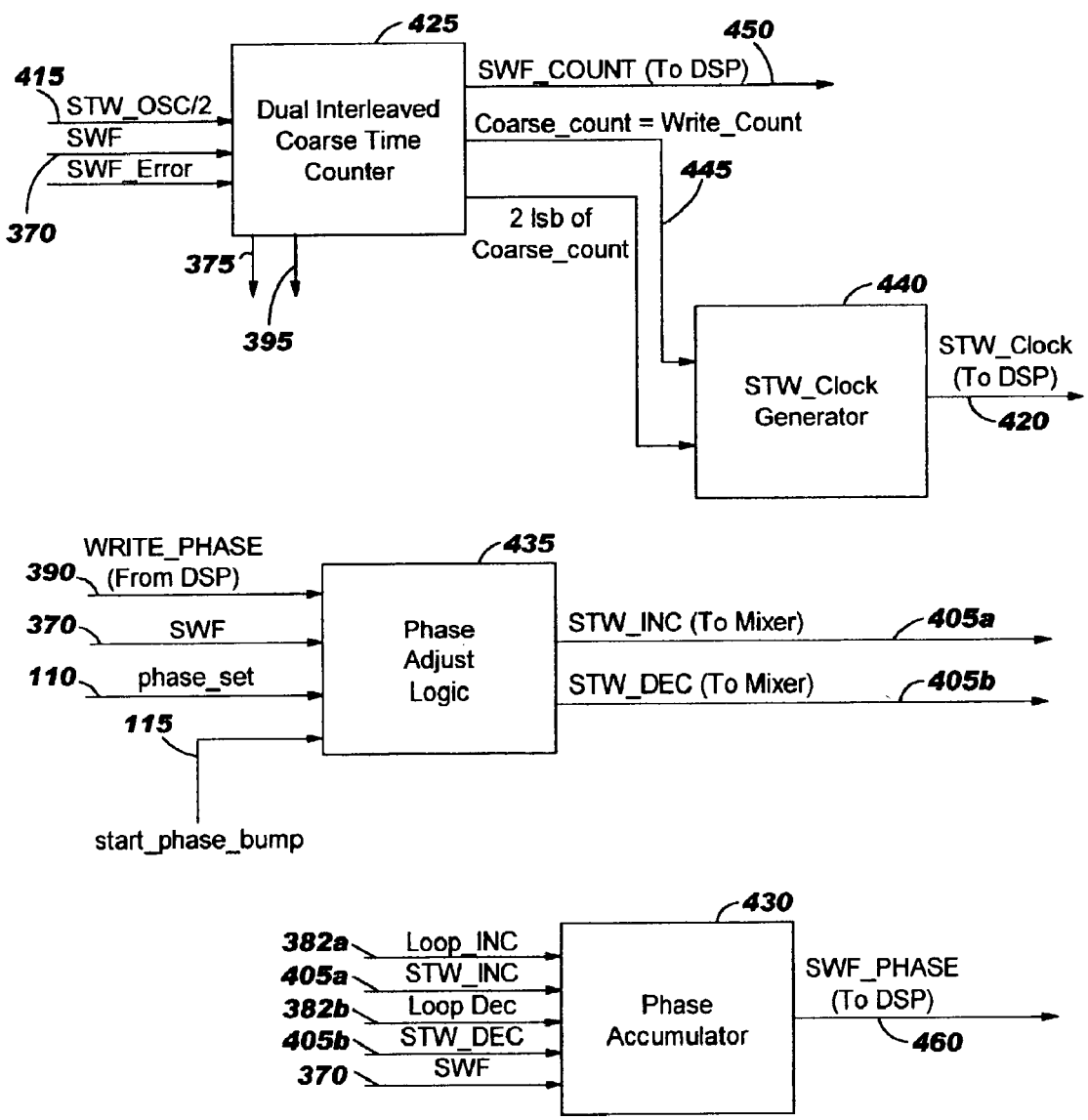
FIG. 3 is a schematic block diagram of the STW sequencer 240 according to the present invention.

FIG. 3 is a schematic block diagram of the STW sequencer 240 according to the present invention. This sequencer block provides all the logic that keeps track of how much the phase is moved, e.g., in skootch mode where phase is to be moved automatically back, or if the user has programmed to move the phase. STW sequencer 240 includes a course time counter circuit 425, a phase accumulator circuit 430, a phase adjust logic circuit 435 and a STW_CLK generator circuit 440. The Course time counter 425 receives STW_OSC signal 415 from the STW oscillator 315 and SWF signal 370 from read logic circuit 350. Course time counter 425 generates STW READ GATE signal 375 and STW WRITE GATE signal 395, a COURSE_COUNT signal 445 (which is essentially another STW WRITE GATE signal) and a SWF_COUNT signal 450. SWF_COUNT signal 450 is the measure of time between detection of successive servo sync words.

Course time counter 425 counts at the STW_OSC frequency and runs continually while read channel 155 (see FIG. 2) is in STW mode. Course time counter 425 begins counting from zero (in one example, in 2-bit time resolution) when SWF signal 370 is received and stops counting when the next SWF signal 370 is received (resetting a COURSE_COUNT register within course time counter 425 to zero again after generating STW READ GATE signal 375. STW WRITE GATE signal 390, SWF_COUNT signal 450 and COURSE_COUNT signal 445). COURSE_COUNT register is written to by hard disk controller 160. In one example, course time counter 425 counts in 2-bit time resolution. This count is the "M" described herein with reference to FIG. 1. Course time counter 425 then compares the STW_OSC signal 415 to the reference oscillator 365 (see FIG. 2) frequency and derives a fractional resolution that combined with the current count triggers STW WRITE GATE signal 395. The fractional resolution is the "x" described with reference to FIG. 1. SWF_COUNT is the measure of time between successive servo words in course time counter 425 bit time resolution (i.e. 2-bit time) and is updated every time a servo sync word is found. In the event that a servo sync word is not found by read logic 350 (a maximum number of STW_OSC cycles is exceeded), a SWF_ERROR signal 455 is generated which starts an error recovery mode.

Phase accumulator 430 receives SWF signal 370, LOOP_INC signal 380, LOOP_DEC signal 385, STW_INC signal 405 and STW_DEC signal 410 and outputs a SWF_PHASE signal 460. SWF_PHASE signal 460 is the measure of the phase change between two successive servo sync words. It is updated every time a servo-sync word is found. SWF_PHASE signal 460 is sent to hard disk controller 160 so individual location errors (defined as physical disk location errors) in writing servo sync words can be determined and adjustments made in the location of the next servo sync word to be written. This adjustment (in terms of a phase shift to STW_OSC signal 415) in the location to write the next servo sync word is passed by hard disk controller 160 via a WRITE_PHASE signal 465. Phase accumulator 430 accumulates all the phase changes between servo sync words by counting all the LOOP_INC signal 382a, LOOP_DEC signal 382b, STW_INC signal 405a, STW_DEC signal 405b pulses. Phase accumulator also accounts for "phase rollover." For example, in 1/96 bit time resolution and 5/96 of a bit time and 101/96 of a bit time resolution differ by one full SWT_OSC signal 415 cycle. In both cases STW_PHASE signal 460 carries a value of 5/96 of a bit time.

The STW_CLK generator 440 receives COURSE_COUNT signal 445 and sends STW_CLK signal 420 to hard disk controller 160 when COURSE_COUNT signal 445 is active. STW_CLK signal 420 is used by hard disk controller 160 to transfer servo-data over bus 215 (FIG. 2).

In normal read channel operation, the phase adjust logic block 435 receives the WRITE_PHASE signal 465 from hard disk controller 160 and generates STW_INC signal 405a or STW_DEC signal 405b as appropriate (and at appropriate values) and passes STW_INC 405a and STW_DEC signal 405b signals to the STW oscillator 315. Thus, the read channel 155 does not make programmable phase shifts, instead, the channel's control loop generates large and small phase corrections real time, dependent on the current error. The large phase corrections are 4/96 of a bit time and the small phase corrections are 1/96 of a bit time. Each of these sized phase corrections have been proven to be effective and glitch free.

The present invention teaches a method whereby the existing read channel signals are utilized as input by the oscillator to provide fast, smooth programmable phase adjustments. The desired phase change is divided by 4, the quotient being first used to create and output Large Phase Bumps or 4/96 bit time, the Remainder is used next to create Small Phase Bumps or 1/96 bit time. This approach is very easy to implement, as the divide by four just divides the word on bit boundaries. Thus, according to the invention, the phase bump is preprogrammed by the user, a programmed word is stored, for example, in a phase set register. In an exemplary embodiment, the stored phase set word is an 8-bit signed word representing the amount of phase bump and direction (increment or decrement).

Figure 4:
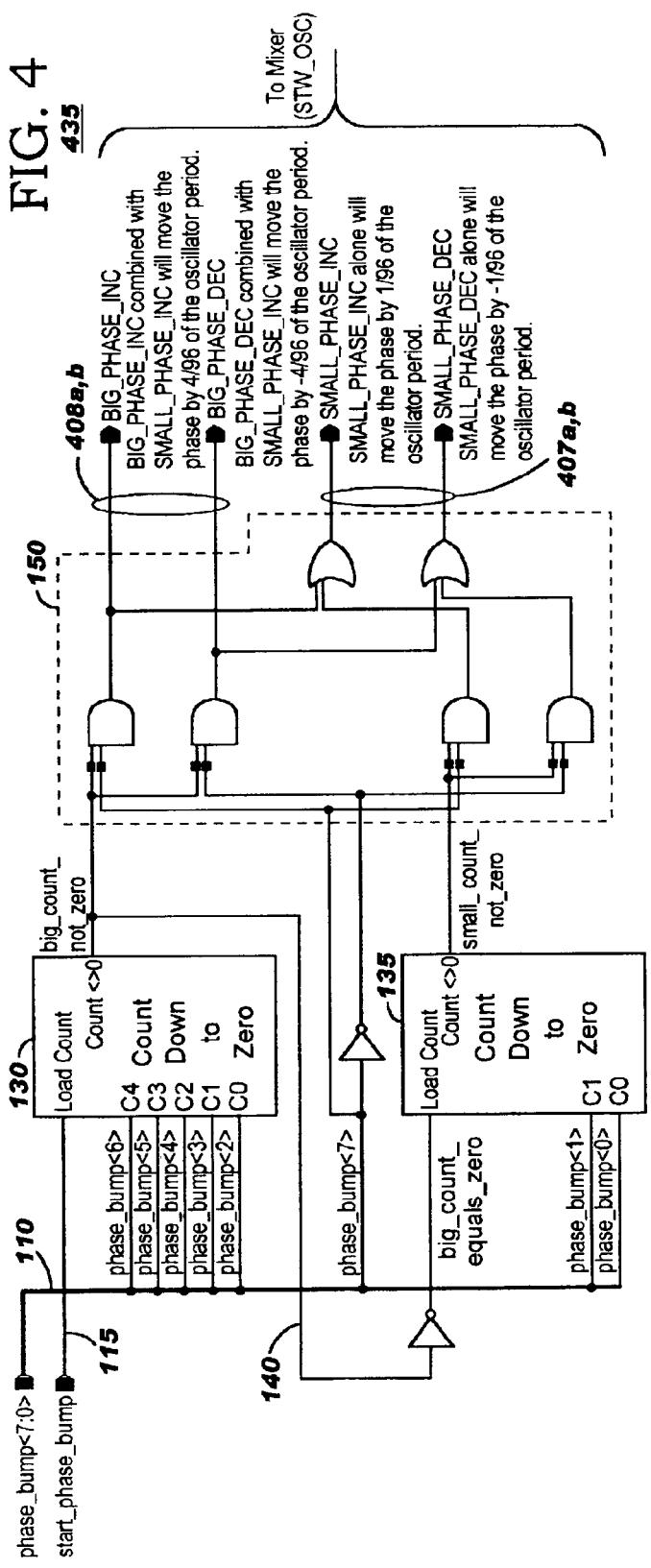
FIG. 4 is a detailed block diagram of the Phase Adjustment block 435 of the sequencer 240 according to the principles of the invention; and, FIG. 5 illustrates a timing diagram depicting timing signals governing a specific example of servo write clock phase movement.

FIG. 4 is a detailed block diagram of the Phase Adjustment block 435 of the sequencer 240 according to the principles of the invention. The outputs of the normal channel timing recovery logic are a set of inc/dec lines 405a,b to the STW oscillator for phase adjustment (i.e., instantaneous frequency bumping).

When the read channel is operating in a Servo Track Writer Mode, these same inc/dec lines are used to move the phase to the proper location. As shown in FIG. 4, a phase adjust register stores the 8-bit word PHASE_BUMP<7:0> 110 that represents the programmed amount of STW bump in sign-magnitude notation. Each bit in PHASE_BUMP will move the phase by 1/96 of the oscillator period and it can be used at different times when it is desired to move the phase in the servo track writer, or when it is desired to begin writing data at a certain location. The user is enabled to program this phase bump number and when a start_phase_bump signal 115 is asserted, the phase begins to move. That is, the start_phase_bump signal 115 is a second input, and that triggers the movement of the phase. As described herein, there are two different times the phase will be moved: 1) either in skootch mode when its being automatically done, or, if a user programs the phase to move before writing the data. In the first case (skootch mode), a skootch mode bit (not shown) has to be set, the STW write mode is on, and, the sync word has been found (SWF asserted), then the phase will be automatically moved when those three conditions are met, and will begin to move the phase by raising start bump phase trigger 115.

In operation, the start_phase_bump signal 115 is asserted, two counter mechanisms (e.g., countdown to zero counter devices 130, 135) are connected in the manner so that a first counter 130 is triggered to count first and the load for the second counter 135 is triggered by the first counter completing a count down for a programmed number of counts specified in the PHASE_BUMP<7:0> 110. As shown in FIG. 4, the line out counter not equal to zero signal 140 prevents triggering of the second counter 135. When the top counter 130 is equal to zero after counting down the programmed amount, then the bottom counter begins to count. When triggered, first the top counter 130 counts in large phase bump units, e.g., corresponding to the programmed high order bits two through seven of the stored PHASE_BUMP<7:0> word 110. The bottom counter then counts down in small phase bump units, according to bit zero and bit one of the stored PHASE_BUMP<7:0> word 110. The large phase bump corresponds to a phase bump of 4/96 clock cycle, almost 4% of a phase movement, or your small bump of 1/96 clock cycle. As shown in FIG. 4, output logic 150 receive the outputs from count down counter devices 130, 135 and generate two pairs of lines 407a,b and 408a,b for effecting phase adjustment. One pair comprises SMALL_PHASE_INC and SMALL_PHASE_DEC 407a,b produces small increment/decrement shifts (1/96 of a bit time if asserted for a half-rate clock period). The other pair BIG_PHASE_INC and BIG_PHASE_DEC 408a,b must be used in conjunction with the small shift pair 407a,b to produce large inc/dec shifts (4/96 of a bit time). Thus, for example, to effect a large phase adjustment (increase) both the BIG_PHASE_INC 408a and SMALL PHASE_INC 407a have to be asserted.

Figure 5:
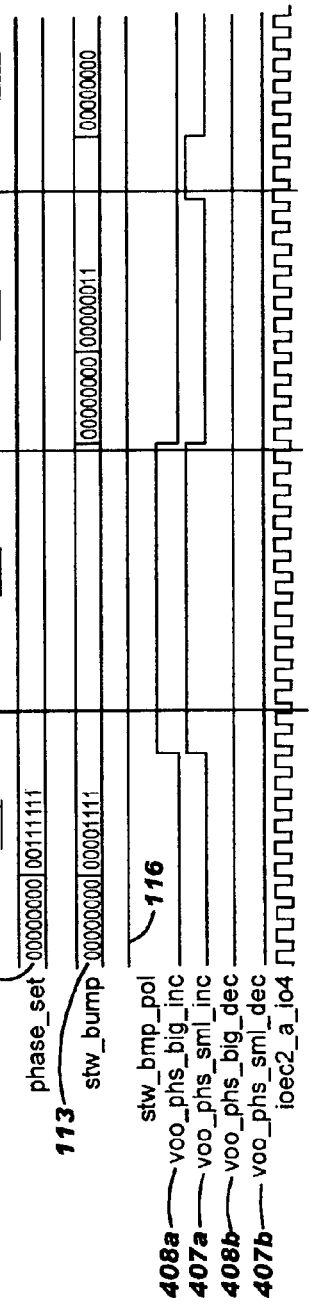

FIG. 5 illustrates a timing diagram depicting timing signals governing a specific example of servo write clock phase movement. In a first time frame 201, there is a phase set signal 110 which is the 8-bit PHASE_BUMP<7:0> word 110 representing the programmed phase adjustment amount. The STW bump signal 113 represents the current state of the count at a moment, so that, when phase bump word 110 is set to '00111111' the STW bump word is set to '00001111' as the bottom two bits are filtered out in order to achieve large phase bumps (4/96 clock cycle). That is, the upper bits (six most significant bits) are used to adjust phase with big increments. After adjusting according to the big increments, at time frame 203, the STW bump 113 is reloaded with the two least significant bits '00000011' where the phase is going to be adjusted in the smaller increment. The STW_bump_pol signal 116 is the polarity of the signal and is either logic low (zero) or logic high (one) and indicates the direction to move the phase (increment or decrement). As shown in FIG. 5, the phase is going to be incremented (advanced) as the STW bump_pol signal 116 is the logic one. The VCO phase signals comprise the SMALL_PHASE_INC and SMALL_PHASE_DEC 407a,b to produce small increment/decrement shifts (1/96 of a bit time if asserted for a half-rate clock period). The other pair BIG_PHASE_INC and BIG_PHASE_DEC 408a,b must be used in conjunction with the small shift pair 407a,b to produce large inc/dec shifts (4/96 of a bit time). Thus, in the example shown in FIG. 5, for example, to effect a large phase adjustment (increase) both the BIG_PHASE_INC 408a and SMALL_PHASE_INC 407a have to be asserted. That is, the DLL/mixer block 315 (FIG. 2) performs a large phase bump when both BIG_PHASE_INC 408a and SMALL_PHASE_INC 407a are asserted high as shown in time frames 201–203. During this time frame, the mixer effects a large phase movement as the counter 130 counts down 15 reference clock cycles due to the STW bump word 113 being set to '00001111' during this time duration. Likewise, when the second counter 135 is triggered between time frames 203 and 204 in FIG. 5, the SMALL_PHASE_INC 407a is asserted for a shorter amount of time, e.g., 3 reference clock cycles, due to the STW bump word 113 being set to '00000011' during this time duration. So in the example provided, the servo write clock phase will be moved first by 4% or 4/96 in 15 oscillator periods, and then it is moved by 1/96 for 3 oscillator periods for a total of 63/96 bit time (or about 63%).

An example pseudo code algorithm representing the logic employed in the phase adjust block 435 of FIG. 3 is now provided:

```
Phase_Bump <7:0> = Desired_Phase_Adjustment <7:0>
Polarity = Phase_Bump<7>
Big_Phase<3:0> = Phase_Bump <6:2>
Small_Phase<1:0> = Phase_Bump <1:0>
While Big_Phase > 0
    {If Polarity = 1, Increment Phase by 4/96 bit time
    If Polarity = 0, Decrement Phase by 4/96 bit time
    Decrement Big_Phase}
While Small_Phase > 0
    {If Polarity = 1, Increment Phase by 1/96 bit time
    If Polarity = 0, Decrement Phase by 1/96 bit time
    Decrement Small_Phase}
```

In the example algorithm, Phase_Bump <7> is the most significant bit and represents the phase polarity; the Phase Bump <6:2> is the next four most significant bits representing programmed large phase bump and, Phase_Bump <1:0> is the two least significant bits representing programmed small phase bump.

The invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A servo track writer (STW) system for writing of information at a location in a servo track of a disk storage media, the servo track writer comprising:

a channel read device implementing an adjustable phase oscillator for generating a system clock signal for governing the timing of read and write operations to a disk storage media, said channel read device implementing read logic for enabling reading a sync word located at said servo track and, write logic for enabling writing servo-data to pre-determined locations in said servo track; and, means for programming a system clock phase change to occur in one or more phase bump units in either positive and negative directions, whereby a phase of said clock may be precisely adjusted when performing a servo-data write operation to said disk at a precise location.

2. The servo track writer system as claimed in claim 1, wherein said phase bump units include one or more large phase bump units implemented to change the phase of said system clock in the positive or negative direction without introducing noise into the system.

3. The servo track writer system as claimed in claim 1, wherein said phase bump units include one or more small phase bump units at a smaller phase granularity than said large phase bump unit.

4. The servo track writer system as claimed in claim 1, wherein said means for programming a system clock phase change to occur in one or more phase bump units in either positive and negative directions, comprises a means for generating one or more phase bump signals representing phase incrementing or decrementing of said system clock signal in said large or small phase bump units, said read channel device comprising mixer device for receiving said one or more phase bump signals and adjusting a system clock phase in response thereto.

5. The servo track writer system as claimed in claim 1, wherein said means for generating one or more phase bump signals representing said phase incrementing or decrementing includes first and second counter devices, said first counter device for initially counting down according to said programmed phase change to assert a phase bump signal for initiating large clock phase bump increments and, said second counter device for next counting down according to said programmed phase to assert said phase bump signals for initiating smaller clock phase bump increments.

6. The servo track writer system as claimed in claim 5, wherein said means for programming a system clock phase change includes receiving and storing a phase bump word, said first and second counter devices responsive to one or more bits of said phase bump word for asserting said large clock phase bump signals, small clock phase bump signals, and, a polarity of said signals, whereby a desired programmed clock phase change is effected.

7. The servo track writer system as claimed in claim 5, whereby a desired programmed clock phase change is effected in order to write to a particular track location.

8. The servo track writer system as claimed in claim 2, wherein said system operates in skootch mode whereby, after synchronizing to a sync word located in a servo track, said channel read device restores said system clock phase to its phase value prior to synchronizing to said sync word so that data may be thereafter written at said pre-determined location relative to said sync word.

9. The servo track writer system as claimed in claim 8, further comprising a device for accumulating a count of clock cycles when performing reading of said servo sync word, said accumulated count used for providing an estimate of a write location in said track relative to said sync word when operating in said skootch mode.

10. The servo track writer system as claimed in claim 2, wherein said large phase bump units is of a granularity corresponding to $4/96$ of an oscillator period.

11. The servo track writer system as claimed in claim 2, wherein said small phase bump units is of a granularity corresponding to $1/96$ of an oscillator period.

12. A method for writing information at a precise location in a servo track of a disk storage media, the servo track capable of being written to by a channel read device, said channel read device for reading a sync word located at said servo track and writing servo-data to a pre-determined location in said servo track, said method comprising:

a) providing an adjustable phase oscillator used to generate a system clock for governing the timing of read and write operations to said disk storage media; and, b) adjusting said system clock when said read channel performs a servo-data write operation to said disk media at a precise location, said adjusting including changing oscillator phase in one or more phase bump units in either positive and negative directions.

13. The method as claimed in claim 12, wherein said adjusting step b) occurs in response to a phase change programmed by a user.

14. The method as claimed in claim 12, wherein said system clock is adjusted in an amount enabling said read channel to perform a servo-data write operation to said disk media at a precise location relative to said sync word.

15. The method as claimed in claim 12, wherein said adjusting step b) comprises steps of:

generating one or more phase bump signals representing phase incrementing or decrementing of said system clock signal in large or small phase bump units; and, implementing a mixer device for receiving said one or more phase bump signals and adjusting a system clock phase in response thereto.

16. The method as claimed in claim 15, wherein said step of generating one or more phase bump signals representing said phase incrementing or decrementing comprises steps of:

initially counting down from a first large phase bump value programmed into a first counter device according to said programmed phase change to assert a phase bump signal for initiating large clock phase bump increments and, thereafter, counting down from a second small phase bump value programmed into a second counter device according to said programmed phase change to assert a phase bump signals for initiating smaller clock phase bump increments.

17. The method as claimed in claim 16, further including steps of receiving and storing a phase bump word, said first and second counter devices responsive to one or more bits of said phase bump word for asserting said large clock phase bump signals, small clock phase bump signals, and, a polarity of said signals, whereby a desired programmed clock phase change is effected.

18. A channel read device interfaced between a disk storage media controller for controlling read and write operations to a disk storage media, and a disk assembly having a read/write head for performing said read and write operations to a disk storage media, said channel read device comprising:

an adjustable phase oscillator for generating a system clock signal for governing the timing of read and write operations to said disk storage media;

read logic device responsive to said disk storage media controller for enabling reading of a sync word located at said servo track and, write logic responsive to said disk storage media controller device for enabling writing of servo-data to pre-determined locations in said servo track; and, means for programming said disk storage media controller device to initiate a system clock phase change to occur in one or more phase bump units in either positive and negative directions; and, a sequencer device responsive to said programmed phase change for adjusting phase of said system clock signal, said phase of said clock may be precisely adjusted to enable said disk assembly to perform a servo-data write operation to said disk at a precise location.

19. The channel read device as claimed in claim 18, wherein said phase bump units include one or more large phase bump units implemented to change the phase of said system clock in the positive or negative direction without introducing noise into the system.

20. The channel read device as claimed in claim 18, wherein said phase bump units include one or more small phase bump units at a smaller phase granularity than said large phase bump unit.

* * * * *